United States Patent Office 2,703,805
Patented Mar. 8, 1955

2,703,805

CYCLOPENTANOPHENANTHRENE DERIVATIVES AND PROCESS

George Rosenkranz and Carl Djerassi, Mexico City, Mexico, assignors to Syntex S. A., Mexico City, Mexico, a corporation of Mexico No Drawing. Application March 28, 1951,
Serial No. 218,095

8 Claims. (Cl. 260—397.45)

The present invention relates to a novel process for the production of cyclopentanophenanthrene derivatives and to certain novel derivatives of the character set forth.

More particularly the present invention relates to the production of $\Delta^4$-pregnene-3,20-dione-17$\alpha$,21-diol and esters thereof (Reichstein's substance S) and $\Delta^4$-pregnene-3,11,20-trione-17$\alpha$,21-diol and esters thereof (cortisone) from appropriate allosteroids.

In the application of George Rosenkranz and Carl Djerassi, Serial No. 140,152, filed January 23, 1950, there is disclosed a process for the production of certain novel 2-iodoketosteroids and a process involving these ketosteroids and especially suitable for the production of $\Delta^4$-3-ketosteroids from allosteroids. In brief, in accordance with the process disclosed in the aforementioned prior application, it was found that 2-bromo-3-ketosteroids of the allo series react with alkali iodides to form the corresponding 2-iodo derivatives. Further, the 2,4-dibromo-3-ketoallosterioids could be utilized to produce 2-iodo-$\Delta^4$-3-ketosteroids either directly by heating with an excess of alkali metal iodide for a period of more than three hours or indirectly by reacting with an alkali metal iodide for a relatively short period of time to form the corresponding 2-iodo-4-bromo compound followed by dehydrobromination. The $\Delta^4$-3-ketosteroids thus produced could be treated with a suitable reducing agent to prepare the corresponding $\Delta^4$-3-ketosteroids.

In accordance with the present invention it has been discovered that the process of the prior application referred to was especially suitable for the production of esters of $\Delta^4$-pregnene-3,20-dione-17$\alpha$,21-diol and esters of $\Delta^4$-pregnene-3,11,20-trione-17$\alpha$,21-diol from the corresponding allosteroids.

There has further been produced in accordance with the present invention certain novel 2,4-dibromoallopregnane derivatives which may be characterized by the following formula:

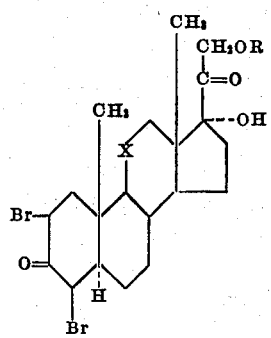

In the foregoing formula X is selected from the group consisting of $CH_2$ and $C=O$ and R is the residue of an organic acid preferably a lower fatty acid such as acetic or propionic.

There have further been produced in accordance with the present invention certain novel 2-iodo-$\Delta^4$-3-keto-steroids which may be characterized by the following formula:

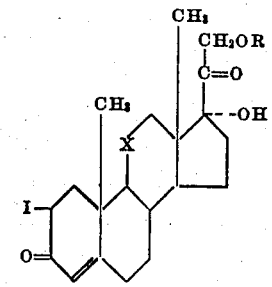

In the above formula X is selected from the group consisting of $CH_2$ and $C=O$ and R is the residue of an organic acid preferably a lower fatty acid such as acetic or propionic.

There has further been discovered in accordance with the present invention a novel process for removing the nuclear iodine atoms from steroids involving the use of a dilute solution of sodium bisulfite.

The process of the present invention may be indicated in general by the following formula:

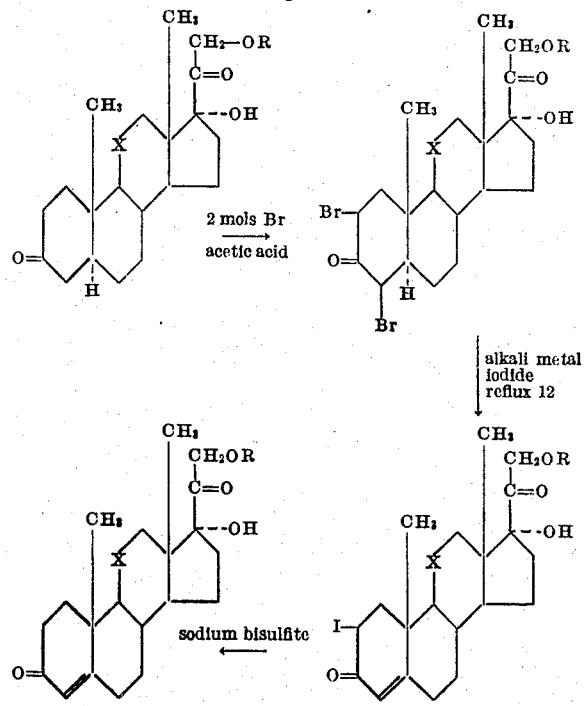

In the above formula X is selected from the group consisting of $CH_2$ and $C=O$ and R is the residue of an organic acid preferably a lower fatty acid such as acetic or propionic.

The process above-outlined may be practiced in general by dissolving the dibromo compounds above indicated in a suitable solvent, as for example chloroform or a mixture of an organic solvent and glacial acetic acid and then adding thereto a brominating agent such as a solution of bromine in acetic acid. Preferably at least 2 mols of bromine are added and a few drops of anhydrous hydrogen bromide is also utilized as a catalyst. In the alternative other methods of dibromination may also be utilized and other brominating agents. Thereafter the 2,4-dibromo compounds are separated and refluxed with at least 2 mols of an alkali metal iodide, such as sodium iodide, in the presence of a suitable solvent, such as acetone, for a period of time in excess of three hours and preferably approximately twelve hours. The product is then extracted and purified to produce the iodo derivatives above indicated. The 2-iodo-$\Delta^4$ derivatives may then be treated with a suitable reducing agent of the type disclosed in the aforementioned prior application, such as chromous chloride. It has been found, however, in accordance with the present invention that an especially desirable reducing agent is a dilute aqueous solution, as for example 5% solution, of sodium bisulfite.

Although the above-outlined process represents the preferred process for the production of the above-identified 2-iodo-$\Delta^4$-3-keto compounds, it is within the scope of the present invention to produce these compounds by other methods disclosed in the aforementioned prior application. Thus the dibromo compounds above-indicated may be reacted for a short period of time with one mol of sodium iodide to produce the corresponding 2-iodo-4-bromo compounds and the 2-iodo-4-bromo compounds can be simultaneously deiodinated and dehydrobrominated by boiling the same with tertiary amines.

The following examples serve to illustrate but are not intended to limit the present invention:

*Example I*

A suspension of 3 g. of allopregnane-3,20-dione-17α,21-diol 21-acetate, prepared in accordance with the process set forth in the application of Rosenkranz et al., Serial No. 140,153, filed January 23, 1950, or that disclosed in Djerassi et al., Serial No. 140,154, filed January 23, 1950, in 25 cc. of chloroform and 50 cc. of glacial acetic acid containing three drops of anhydrous hydrogen bromide in acetic acid was treated dropwise with swirling with 26 cc. of a solution of bromine in acetic acid (100 mg. per cc.). At the end of the addition all of the solid had gone into solution and the solution was pale yellow. After the addition of 3 drops of hydrogen bromide (to promote the rearrangement of any 2,2-dibromo derivative to the 2,4 isomer) the solution was allowed to stand at room temperature over night. More chloroform was added, the acid removed by washing with water-bicarbonate solution, and the chloroform distilled under reduced pressure. Crystallization of the residue from hexane-acetone gave pure 2,4-dibromoallopregnane-3,20-dione-17α,21-diol 21-acetate having a melting point of 173–176° C. (decomposition). For practical purposes this intermediate need not have been purified but can be refluxed directly with 4 g. of sodium iodide and 100 cc. of acetone for twelve hours. After pouring into water containing some sodium thiosulfate, the product was extracted with ether, washed well with water, dried, evaporated and the intermediate iodo derivative 2-iodo-$\Delta^4$-pregnene-3,20-dione-17α,21-diol 21-acetate was fluxed for one-half hour with 15 cc. of dioxane and 20 cc. of a 5% aqueous solution of sodium bisulfite. The mixture was then diluted with water, extracted with chloroform and the extract washed with sodium carbonate and water until neutral. Evaporation of the chloroform and recrystallization of the residue from acetone produced $\Delta^4$-pregnene-3,20-dione-17α,21-diol 21-acetate with a melting point of 234–236° C., undepressed on admixture with an authentic specimen.

*Example II*

A solution of allopregnane-3,11-20-trione-17α,21-diol 21-acetate, prepared in accordance with the process set forth in the application of Pataki et al., Serial No. 200,877, filed December 14, 1950, in 150 cc. of acetic acid containing two drops of hydrogen bromide in acetic acid was treated at 15° dropwise with 8 cc. of a solution of bromine in acetic acid (98 mg. per cc.). After decolorization was complete, two additional drops of hydrogen bromine in acetic acid were added and the solution allowed to stand at room temperature for twenty hours. Dilution with water afforded the crystalline 2,4-dibromoallopregnane-3,11,20-trione-17α,21-diol 21-acetate, which was not recrystallized, but rather refluxed directly with 3 g. of sodium iodide and 100 cc. of acetone for twelve hours. After proceeding as in Example I, the intermediate iodo compound, presumably possessing the 2-iodo-$\Delta^4$-pregnene-3,11,20-trione-17α,21-diol 21-acetate structure was dissolved in acetone and treated in a current of carbon dioxide with a solution of chromous chloride (prepared from 15 g. of amalgamated zinc and 7.5 g. of chromic chloride exactly as described in J. A. C. S. 72, 4080 (1950)) for fifteen minutes. Dilution with water, filtration of the product or extraction with chloroform followed by recrystallization from acetone led to $\Delta^4$-pregnene-3,11,20-trione-17α,21-diol 21-acetate with melting point 243–245° C., undepressed on admixture with an authentic specimen. The infrared spectra also were identical.

We claim:

1. A process for the production of a compound selected from the class consisting of 21 esters of $\Delta^4$-pregnene-3,20-dione-17α,21-diol and 21 esters of $\Delta^4$-pregnene-3,11,20-trione-17α,21-diol which comprises dibrominating a compound selected from the group consisting of allopregnane-3,20-dione-17α,21-diol and allopregnane-3,11,20-trione-17α,21-diol to form the corresponding 2,4-dibromo derivatives, heating said 2,4-dibromo derivatives with an alkali metal iodide to form the corresponding 2-iodo-$\Delta^4$-derivatives and treating said 2-iodo-$\Delta^4$-derivatives with a reducing agent.

2. The process according to claim 1 wherein the reducing agent is a dilute aqueous solution of sodium bisulfite.

3. A process for the production of a $\Delta^4$-3-ketosteroid which comprises heating a 2-iodo-$\Delta^4$-3-ketosteroid with an aqueous solution of dilute sodium bisulfite.

4. A process for removing iodine atoms from a nuclear iodine substituted steroid which comprises heating said steroid with sodium bisulfite.

5. A steroid compound having the following general formula:

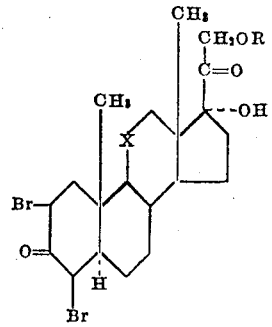

wherein X is selected from the group consisting of $CH_2$, and C=O and R is a lower fatty acid aryl group.

6. A new compound consisting of 2,4-dibromoallopregnene-3,20-dione-17α,21-diol 21-acetate.

7. A new compound consisting of 2,4-dibromoallopregnene-3,11,20-trione-17α,21-diol 21-acetate.

8. A process for producing $\Delta^4$-pregnene-3,11,20-trione-17 alpha, 21-diol 21-acetate which comprises reacting allopregnane-3,11,20-trione-17 alpha, 21-diol 21-acetate with sufficient bromine to introduce bromine at the 2 and 4 positions, heating said brominated derivative with an alkali metal iodide in acetone to form 2-iodo-$\Delta^4$-pregnene-3,11,20-trione-17 alpha, 21-diol 21-acetate and reducing the latter compound to obtain $\Delta^4$-pregnene-3,11,20-trione-17 alpha, 21-diol 21-acetate.

References Cited in the file of this patent

UNITED STATES PATENTS

| | | |
|---|---|---|
| 2,311,638 | Butenandt | Feb. 23, 1943 |
| 2,340,388 | Inhoffen | Feb. 1, 1944 |
| 2,492,189 | Sarett | Dec. 27, 1949 |